US008527894B2

(12) United States Patent
Hughes et al.

(10) Patent No.: US 8,527,894 B2
(45) Date of Patent: Sep. 3, 2013

(54) KEYBOARD BASED GRAPHICAL USER INTERFACE NAVIGATION

(75) Inventors: Rebecca Hughes, Somerville, MA (US); James Martineau, Lowell, MA (US); Michael S. McCowan, Ayer, MA (US)

(73) Assignee: International Business Machines Corporation, Armonk, NY (US)

( * ) Notice: Subject to any disclaimer, the term of this patent is extended or adjusted under 35 U.S.C. 154(b) by 1260 days.

(21) Appl. No.: 12/344,605

(22) Filed: Dec. 29, 2008

(65) Prior Publication Data
US 2010/0169818 A1    Jul. 1, 2010

(51) Int. Cl.
*G06F 3/048* (2013.01)
*G06F 3/02* (2006.01)

(52) U.S. Cl.
USPC ............ 715/773; 715/822; 715/827; 345/168

(58) Field of Classification Search
USPC ......... 715/773, 822, 827, 831, 840; 345/168, 345/160
See application file for complete search history.

(56) References Cited

U.S. PATENT DOCUMENTS

| | | | | |
|---|---|---|---|---|
| 6,199,125 | B1 * | 3/2001 | Cortesi ........................... | 710/67 |
| 8,351,992 | B2 * | 1/2013 | Strom ........................... | 455/566 |
| 2002/0126153 | A1 * | 9/2002 | Withers et al. ................. | 345/773 |
| 2002/0190946 | A1 * | 12/2002 | Metzger ........................ | 345/156 |
| 2004/0104942 | A1 | 6/2004 | Weigel | |
| 2004/0174400 | A1 * | 9/2004 | Herigstad et al. ............. | 345/864 |
| 2005/0024341 | A1 | 2/2005 | Gillespie et al. | |
| 2005/0197763 | A1 * | 9/2005 | Robbins et al. ................ | 701/200 |
| 2006/0176279 | A1 * | 8/2006 | Bersenev et al. ............. | 345/169 |
| 2008/0049142 | A1 | 2/2008 | Schohn et al. | |
| 2008/0104513 | A1 * | 5/2008 | Krogh ........................... | 715/711 |
| 2010/0090958 | A1 * | 4/2010 | Perez et al. .................... | 345/169 |

OTHER PUBLICATIONS

Pending U.S. Appl. No. 11/960,559, Kirk et al., "Emulating a Keyboard on a Touch Screen Monitor of a Computing System", Filed Dec. 19, 2007.
Cook, "Cursory", <http://tomcooke.me.uk/?page_id=39>, Mar. 9, 2008 (Last viewed Dec. 28, 2008).
Pash, "Mouser", <http://lifehacker.com/software/mouser/hack-attack-operate-your-mouse-with-your-keyboard-212816.php_>, Nov. 7, 2006 (Last viewed Dec. 28, 2008).

* cited by examiner

*Primary Examiner* — Kieu Vu
*Assistant Examiner* — Blaine Basom
(74) *Attorney, Agent, or Firm* — Cuenot, Forsythe & Kim, LLC

(57) ABSTRACT

A computer-implemented method of navigating a GUI can include, responsive to a user input initiating a navigation mode, overlaying, atop of the GUI located within a first layer, a virtual keyboard within a second layer, wherein the virtual keyboard includes a plurality of virtual keys. The method can include, for each virtual key, associating the virtual key with a region of the first layer including an area of the GUI beneath the virtual key. The method can include mapping each virtual key with a physical key of a physical keyboard communicatively linked with a computer rendering the GUI and, responsive to a user input selecting a physical key of the physical keyboard, selecting a region corresponding to the selected physical key. A level of magnification for the selected region can be increased within the first layer while keeping the virtual keyboard sizing constant.

15 Claims, 5 Drawing Sheets

KEYBOARD BASED GRAPHICAL USER INTERFACE NAVIGATION

BACKGROUND

The embodiments of the present invention relate to navigating a graphical user interface (GUI) with a keyboard. GUIs provide a user with an intuitive method of interacting with computing devices. GUIs present graphical representations of objects, as "icons," which can be directly manipulated by the user to perform computing operations. Computing operations can be performed within the GUI by manipulating icons presented on a two dimensional display device using some sort of pointing device. As such, GUIs can reduce or replace the need for text based commands when interacting with the computing device.

Another method of GUI interaction entails the use of touch screen displays. Touch screen displays allow direct physical manipulation, by the user, of icons presented by the GUI. Touch screen displays can detect user contact with the surface of the display. The geographical location of the user contact with the touch screen display can be determined by the system. Accordingly, users can directly manipulate icons displayed upon the touch screen display without the use of a pointing device.

Accessible computing refers to the accessibility of a computing system to all types of users. This accessibility is especially important to users with physical or cognitive disabilities such as paralysis, hearing or visual impairments, dyslexia, autism, and the like. GUIs, pointing devices, and touch screen displays are a few of the computing innovations that seek to provide greater flexibility to users when interacting with computing devices. In this manner, innovations such as GUIs, pointing devices, and touch screen displays can increase user accessibility to computing devices.

BRIEF SUMMARY OF THE INVENTION

The embodiments disclosed within this specification relate to graphical user interfaces (GUIs). One embodiment of the present invention can include a computer-implemented method of navigating a GUI. The method can include, responsive to a user input initiating a navigation mode, overlaying, atop of the GUI located within a first layer, a virtual keyboard within a second layer, wherein the virtual keyboard includes a plurality of virtual keys. The method further can include, for each virtual key, associating the virtual key with a region of the first layer including an area of the GUI beneath the virtual key. The method can include mapping each virtual key with a physical key of a physical keyboard communicatively linked with a computer rendering the GUI and, responsive to a user input selecting a physical key of the physical keyboard, selecting a region corresponding to the selected physical key. A level of magnification for the selected region can be increased within the first layer while keeping the virtual keyboard sizing constant.

Another embodiment of the present invention can include a computer-implemented method of performing programmatic actions through a GUI. The method can include, responsive to a user input initiating a navigation mode, overlaying, atop of the GUI located within a first layer, a virtual keyboard within a second layer, wherein the virtual keyboard includes a plurality of virtual keys. Further, for each virtual key, the virtual key can be associated with a region of the first layer including an area of the GUI beneath the virtual key. The method further can include mapping each virtual key with a physical key of a physical keyboard communicatively linked with a computer rendering the GUI and, responsive to a user input selecting a physical key mapped to a virtual key above a graphic representation of an icon within the region of the first layer associated with the virtual key, initiating a programmatic action on the object.

Yet another embodiment of the present invention can include a computer program product including a computer-usable medium having computer-usable program code that, when executed, causes a machine to perform the various steps and/or functions described herein.

DETAILED DESCRIPTION OF THE INVENTION

Figure 1:
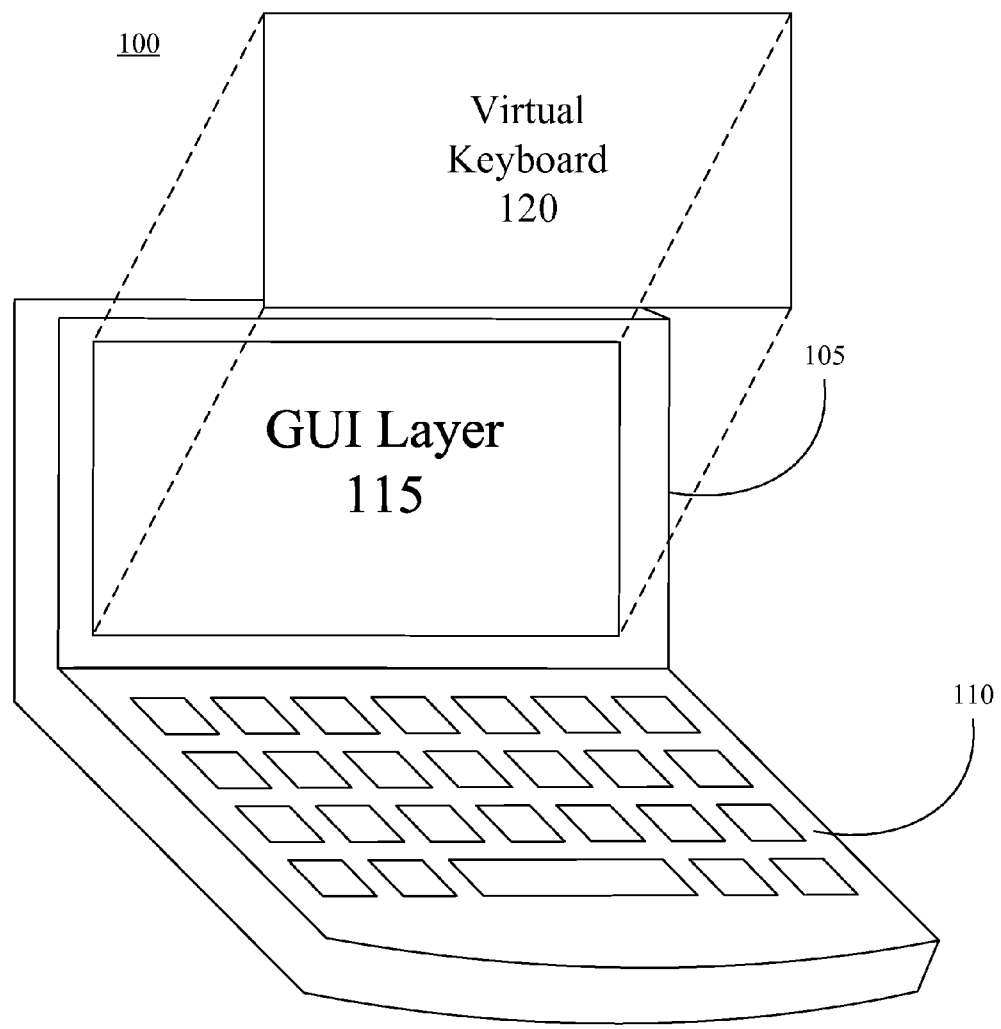
FIG. 1 is a first block diagram illustrating a computing device for graphical user interface (GUI) navigation in accordance with one embodiment of the present invention.

As will be appreciated by one skilled in the art, embodiments of the present invention may take the form of a system, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, an embodiment of the present invention may take the form of a computer program product embodied in any tangible medium of expression having computer-usable program code embodied in the medium.

Any combination of one or more computer usable or computer readable media may be utilized. The computer-usable or computer-readable medium may be, for example, but is not limited to, an electronic, magnetic, optical, magneto-optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The embodiments disclosed within this specification relate to navigating a graphical user interface (GUI). More particularly, the embodiments relate to using a keyboard to navigate and perform programmatic actions within the GUI. Having multiple methods of interacting with a computing device can provide increased computing accessibility to a wider variety of users. As keyboards are ubiquitous to modern computing devices, providing a method of keyboard based navigation for the GUI creates another avenue of computing accessibility to users without access to, or capacity to operate, pointing devices and touch screen displays.

In accordance with the inventive arrangements disclosed herein, a user can invoke a navigation mode while interacting with a GUI rendered on a display of a computing device. In the navigation mode, a virtual keyboard can be superimposed over the GUI on the display. Each virtual key of the virtual keyboard can be mapped to a physical key of a physical keyboard communicatively linked with the computing device. Pressing a physical key can zoom the GUI into a region of the GUI located beneath the virtual key mapped to the physical pressed by the user. The zoomed region of the GUI can be relocated under the virtual keyboard.

Continuing iteratively in this manner, the user can navigate to a desired object or region of the GUI. Upon reaching the desired object or location, a user input can assign a particular programmatic action to the physical keys of the physical keyboard. Pressing a physical key on the physical keyboard can initiate the programmatic action on an object located beneath the virtual key mapped to the pressed physical key.

FIG. 1 is a first block diagram illustrating a computing device 100 for GUI navigation in accordance with one embodiment of the present invention. Computing device 100 can increase computing accessibility by providing a keyboard based system for navigating a GUI and performing programmatic actions within the GUI. Computing device 100 can include display device 105, and physical keyboard 110. Computing device 100 can be any data processing system or device that can store and/or execute program code, and more specifically, program code related to the display and operation of a GUI as described within this specification.

A computer suitable for storing and/or executing program code will include at least one processor coupled directly or indirectly to physical memory elements through a system bus. The memory elements can include local memory employed during actual execution of the program code, e.g., random access memory, bulk storage, and cache memories which provide temporary storage of at least some program code in order to reduce the number of times code must be retrieved from bulk storage during execution.

Input/output or I/O devices, such as physical keyboard 110, and display 105, can be coupled to computing device 100 either directly or through intervening I/O controllers. Physical keyboard 110 can include a plurality of physical keys to which a user may provide input to computing device 100. Additionally, display 105 can present graphical representations of objects, or "icons," related to the GUI which can be programmatically operated upon and manipulated by the user.

Network adapters may also be coupled to the computing device 100 to enable the computing device 100 to become coupled to other computing devices or remote printers or storage devices through intervening private or public networks. Modems, cable modems, and Ethernet cards are just a few of the currently available types of network adapters. Computing device 100 can execute operational software, whether an operating system or an operating system executing one or more application programs.

Computing device 100 can be implemented as a workstation, a desktop or laptop computing device, a dedicated multimedia device, a wired or wireless handheld multi-media device, a personal digital assistant, a mobile or terrestrial telephone, or any other type of computing device containing some form of physical keyboard and display that is capable of rendering a GUI.

GUI layer 115 can be any graphical environment displayed upon display 105 that is rendered by the operating system and/or application program in cooperation with the operating system of computing device 100. GUI layer 115 can include the graphic representations of objects, e.g., icons, that may be rendered on display 105. Within this specification, from time to time, reference will be made to icons. It should be appreciated that the phrase icon and object may be used interchangeably within this specification to refer to any type of graphic object or graphical representation of an object rendered within the GUI layer 115. Icons can include graphical representations of a program, a programmatic function, a file, data or a collection of data, or any other object subject that may be the subject of a programmatic action. Icons presented within GUI layer 115 can be the subject of a variety of programmatic actions, e.g., moving, copying, opening, scrolling, and the like. Accordingly, while the specification may reference implementing a programmatic action upon an icon, it should be appreciated that the subject of the programmatic action will be the object stored in memory that is represented by the icon.

GUI layer 115 may take the entirety of the display area of display 105. Alternatively, the size of GUI layer 115 can be limited to a region of display 105 which is less than the total viewable area of display 105. A user can navigate within an area defined by GUI layer 115 in order to access various regions of, and icons within, GUI layer 115.

Virtual keyboard 120 can be a graphical representation of physical keyboard 110. Virtual keyboard 120 can be rendered by computing device 100. Virtual keyboard 120 can be visually overlaid atop GUI layer 115 in a manner that does not fully obscure the contents of GUI layer 115. For example, virtual keyboard 120 can be rendered graphically as a translucent, transparent, or semi-transparent layer which is comprehensible to the user while not fully obscuring GUI layer 115. Virtual keyboard 120 can graphically represent any of a variety of keyboards and/or keypads that may be communicatively linked with computing device 100. In addition, virtual keyboard 120, as graphically displayed, can present all or a portion of the keyboard and/or keypad communicatively linked with computing device 100.

Typically, GUI layer 115 is navigated using a pointing device, e.g., a mouse, touchpad, or the like, that may be used to select or manipulate icons within GUI layer 115. Movement of the pointing device navigates the cursor within GUI layer 115. User inputs received through the pointing device, e.g., a right click of a mouse, can initiate a variety of programmatic actions on icons selected by the pointing device. Appreciably, the GUI allows one to manipulate icons that represent programmatic objects. Moving or dragging an icon invokes the same action upon the object represented by that icon. Touch screen displays provide similar functionality within GUI layer 115. Using a touch screen, the user can directly manipulate icons presented within GUI layer 115 as well as initiate programmatic actions on those icons. At times, however, the pointing device or touch screen may not be available to, or utilizable by, a user. In that case, providing the user an alternative technique for interacting with the GUI is desirable.

Using computing device 100, a user input can invoke a navigation mode. In one embodiment, a predetermined physical key or combination of physical keys, e.g., a function key, on physical keyboard 110 can be mapped to invoke the navigation mode when pressed. Responsive to the navigation mode being initiated, computing device 100 can overlay virtual keyboard 120 atop of GUI layer 115. Each virtual key of the virtual keyboard 120 can be associated with a region of GUI 110 located beneath, or directly beneath, each respective virtual key. Additionally, each virtual key can be mapped to a corresponding physical key of physical keyboard 110.

Although the GUI layer 115 and the virtual keyboard 120 can be presented as overlaying layers, information contained within each layer can remain intelligible to the user. A user can navigate to a particular region of GUI layer 115 by selecting a virtual key which overlays the desired region of GUI layer 115 and pressing a physical key mapped to the selected virtual key. Responsive to the user pressing the physical key, computing device 100 can zoom into the selected region of GUI layer 115. In other words, the selected region of GUI layer 115 can be magnified and re-rendered with an increased level of magnification. Virtual keyboard 120 can be overlaid, or remain overlaid, atop the magnified, selected region.

Figure 2:
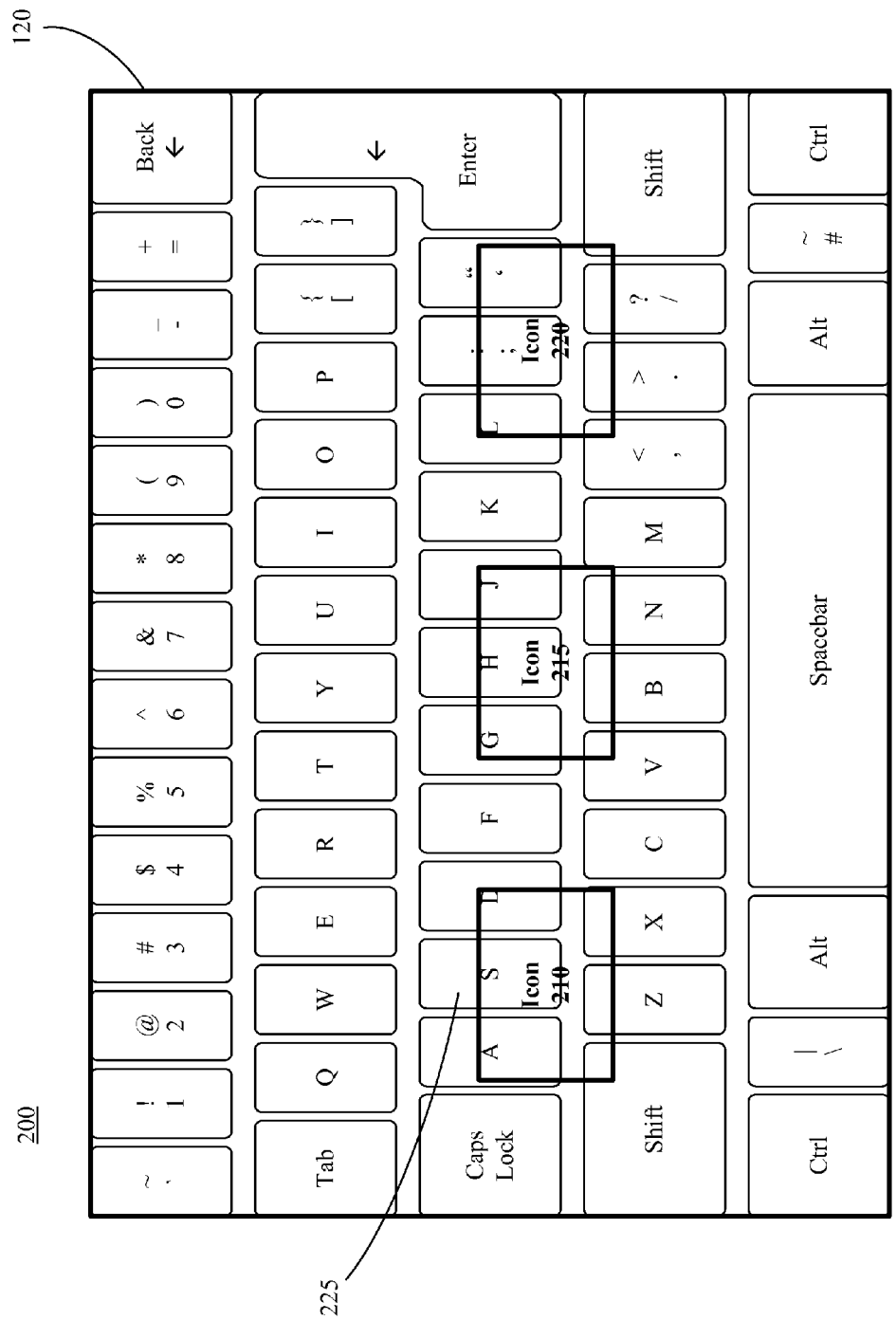
FIG. 2 is a first pictorial view illustrating a user interface for keyboard based GUI navigation in accordance with another embodiment of the present invention.

FIG. 2 is a first pictorial view illustrating a user interface 200 for keyboard based GUI navigation in accordance with another embodiment of the present invention. A system, as described with reference to FIG. 1, can render user interface 200 upon a display. User interface 200 illustrates the case where a user has selected a function key or a key combination invoking the navigation mode. Accordingly, the system has overlaid virtual keyboard 120, which lies within a second layer, atop of the GUI, which resides within a first layer. User interface 200 can include the virtual keyboard as well as icons 210, 215, and 220.

Virtual keyboard 120 can be a graphic representation of a physical keyboard communicatively linked with the computing device outputting user interface 200. Virtual keyboard 120 can represent a portion or all of the physical keys of the physical keyboard communicatively linked with the computing device. In one embodiment, virtual keyboard 120 can graphically present, as virtual keys, all physical keys of the physical keyboard except for two or more function keys of the physical keyboard. In that case, the two or more function keys can be reserved for user inputs that initiate programmatic actions to icons within the GUI layer of user interface 200. Although implemented as a Qwerty keyboard in FIG. 2, virtual keyboard 120 can be any keyboard, keypad, or other input device which contains two or more physical keys which may be selected by the user and are separated in a manner that allows a graphical representation of the input device to be overlaid atop the GUI layer. As such, the examples presented within this specification are not intended to limit the embodiments disclosed.

Icons 210-220 can represent objects within the GUI layer of user interface 200. Each of icons 210-220 can be the subject of a programmatic action. For example, an icon can be a button of an operating system or an application, a file or a shortcut to a file to be opened, an application drop down menu to be navigated, a menu item on the drop down menu, or any other visual element that may exist and be activated or selected within a GUI environment.

In operation, virtual keyboard 120 can be overlaid atop icons 210-220 of the GUI layer while not obscuring icons 210-220. For example, virtual keyboard 120 can be graphically presented in a semi-transparent form, thereby allowing icons 210-220 to be clearly discerned or viewed by a user. In another example, icons 210-220 can be highlighted or have a change of color to make icons 210-220 intelligible under virtual keyboard 120. As such, the graphical presentation of virtual keyboard 120 and icons 210-220 can be implemented in any manner that concurrently retains intelligibility of virtual keyboard 120 and icons 210-220.

Each virtual key, e.g. virtual key 225, in virtual keyboard 120 can be associated with a geographical region (region) of the GUI layer beneath each respective virtual key. In one embodiment, each region can be defined by the perimeter of the virtual key directly above. That is, each region can be located exactly below the virtual key above and not extend beyond the perimeter of that virtual key. In another embodiment, the region of the GUI layer associated with each virtual key can extend beyond the perimeter of the virtual key by a predetermined distance in one or more or all directions. Accordingly, regions associated with each virtual key can overlap. In another embodiment, the region associated with each virtual key can be adjustable and defined by the user or the system. For example, a region can extend, in all directions, one centimeter beyond the perimeter of virtual key 225 based upon a user specified setting. In that case, the region associated with virtual key 225 would overlay the region of each neighboring virtual key of virtual key 225.

Each virtual key within virtual keyboard 120 can be mapped to a physical key of the physical keyboard communicatively linked with the computing device associated with user interface 200. In one embodiment, each virtual key can be mapped to an analogous physical key, e.g., having a same letter, number, or symbol, as the virtual key. For example, virtual key 225 contains the letter "S" and can be mapped to the physical "S" key on the physical keyboard.

A user wanting to navigate to icon 210 within user interface 200 can determine which virtual keys overlay icon 210. In user interface 200, multiple virtual keys can overlay icon 210. The user can determine that virtual key 225 overlays the perimeter of icon 210 and press the physical key mapped to virtual key 225. Responsive to the user pressing the physical key mapped to virtual key 225, user interface 200 can navigate to, or "zoom into," the region associated with virtual key 225.

It should be noted that multiple virtual keys can make contact with icon 210, e.g., contact or overlap the perimeter of icon 210 or reside completely within the perimeter of icon 210. As such, pressing the physical key mapped to any of the multiple virtual keys that contact icon 210 can navigate the user to icon 210. For example, the user can select the "A," "D," "X," "Z," or "left shift" physical keys to achieve substantially the same result as selecting the "S" physical key. Additionally, the size of the region associated with each virtual key can affect the level of accuracy necessary when selecting a virtual key that navigates to icon 210.

For example, the region associated with each virtual key can extend well beyond the perimeter of each virtual key. A user can strike a physical key mapped to a virtual key that is close to, but outside of, the perimeter of icon 210. As the region associated with each virtual key can extend beyond the perimeter of each virtual key, the zoomed in region presented on user interface 200 after the physical key mapped to the virtual key is pressed will likely contain icon 210 even though the virtual key lay outside the perimeter of icon 210, e.g., not directly contact icon 210.

Figure 3:
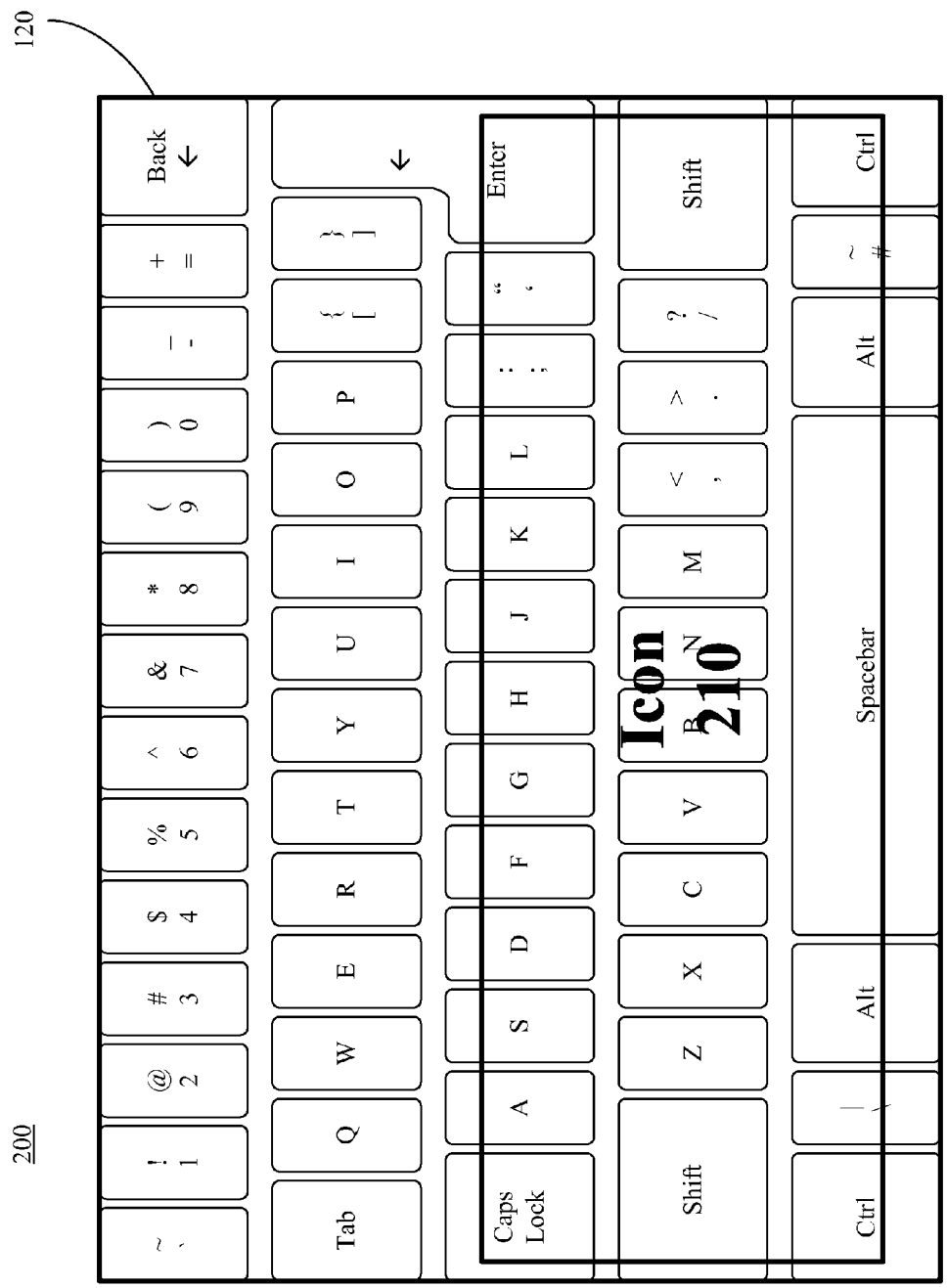
FIG. 3 is a second pictorial view illustrating a user interface for keyboard based GUI navigation in accordance with another embodiment of the present invention.

FIG. 3 is a second pictorial view illustrating user interface 200 for keyboard based GUI navigation in accordance with another embodiment of the present invention. FIG. 3 illustrates the state of user interface 200 after a user selection of a region of a GUI layer associated with virtual key 225 has occurred as illustrated in FIG. 2. Like numbers will be used to refer to the same components throughout this specification. User interface 200 can include virtual keyboard 120 as well as icon 210.

Referring to FIG. 3, the selected region associated with virtual key 225 can be magnified and redrawn within a portion of user interface 200 occupied by the virtual keyboard 120. Additionally, the magnified region can be centered to reside beneath virtual keyboard 120. The level of magnification can be determined by the size of the region associated with each virtual key and the portion of user interface 200 occupied by virtual keyboard 120. The selection and magnification process can allow the user to navigate, or zoom in, to an icon, e.g., icon 210, by selecting a physical key mapped to a virtual key associated with a region of the GUI layer that contains the desired icon.

Virtual keyboard 120 can remain overlaid atop the selected region. In one embodiment, the virtual keyboard 120 can remain a same size throughout the navigation process. Once the GUI layer is redrawn beneath virtual keyboard 120, the various regions of the GUI layer that are mapped to individual keys of virtual keyboard 120 can be remapped. For example, within the magnified and redrawn region, each virtual key can be mapped to, or define, a sub-region that lies directly beneath that virtual key or that extends beyond the perimeter of the virtual key as described with reference to FIG. 2. With virtual keyboard 120 in place, the user can select a sub-region of the selected region to navigate to by selecting a virtual key associated with the sub-region. In this manner, the user can continue an iterative process of navigating within the GUI layer. Subsequent to an iteration of the navigation process, the selected sub-region can be magnified and rendered within a portion of user interface 200. Accordingly, virtual keyboard 225 can be overlaid atop the selected sub-region. The iterative process can cease when the user has navigated to a desired region of, or icon within, the GUI layer.

It should be noted that the navigation process can enable the user to navigate to either a region of the GUI layer or an icon within the GUI layer. For example, the user may desire to magnify a region of the GUI layer to improve readability of text within the region. Alternatively, the user may desire to perform an operation on an icon. In that case, the user may iteratively navigate within the GUI layer until a virtual key resides over the icon. A physical key mapped to the virtual key superimposed over the icon then can be selected to implement a programmatic action upon the icon.

Figure 4:
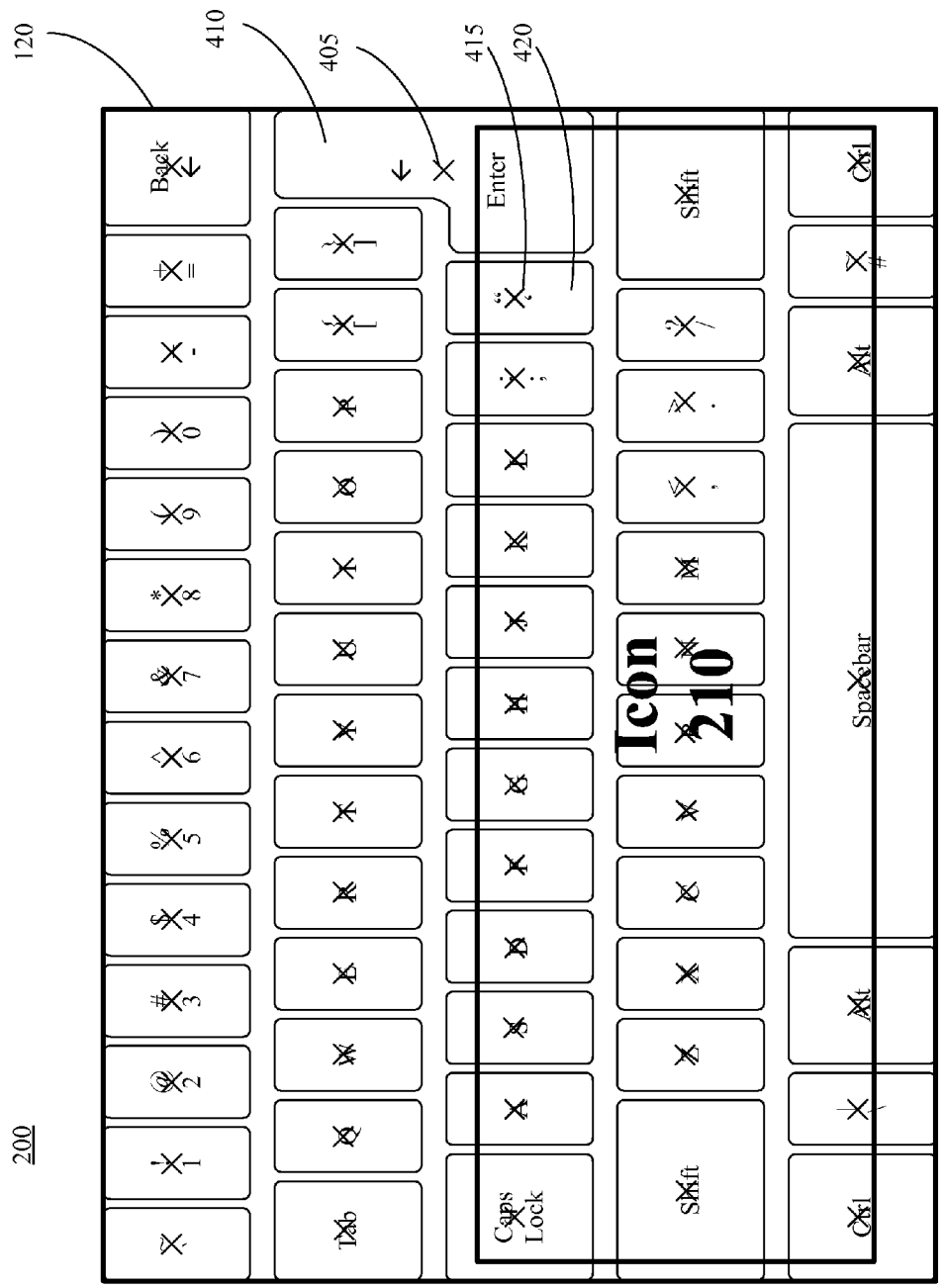
FIG. 4 is a third pictorial view illustrating a user interface for keyboard based GUI navigation in accordance with another embodiment of the present invention.

FIG. 4 is a third pictorial view illustrating the user interface 200 for keyboard based GUI navigation in accordance with another embodiment of the present invention. FIG. 4 illustrates the state of user interface 200 after a user input assigning a programmatic action to the physical keys of the system has occurred. User interface 400 can include virtual keyboard 120 as well as icon 210.

Having navigated to the region of the GUI layer including icon 210, a user input can assign a programmatic action to each mapped physical key of the physical keyboard. Further, each of the mapped physical keys will be assigned a same programmatic action. The assigning of the programmatic action can be implemented with a user input selecting one or more of the physical keys not mapped to the virtual keyboard, e.g., keys devoted to acting as function keys. As the physical keys mapped to virtual keys can be reserved for selecting regions of the GUI layer during navigation, unmapped keys of the physical keyboard can be used to assign various programmatic actions to the mapped physical keys.

In one embodiment, the user can press one of a plurality of function keys. Responsive to the selection of a function key, a programmatic action can be assigned to the mapped physical keys based upon the particular function key selected. Each function key can assign a particular programmatic action to the mapped physical keys responsive to the particular function key being pressed. For example, a user can navigate with the physical keyboard to an icon within the GUI layer associated with a file. Pressing the F1 function key, the programmatic action "open file" can be assigned to the mapped physical keys of the physical keyboard. An "F" virtual key can be located directly over the file icon and mapped to the "F"

physical key. Accordingly, the user can strike the "F" physical key on the physical keyboard, thereby initiating the opening of a file associated with the icon beneath the virtual key "F."

Responsive to the user input assigning the programmatic action to the physical keys, a change of appearance of each virtual key can occur. The change of appearance can signify that a programmatic action has been assigned to each respective physical key, identify a type of programmatic action assigned to the physical keys, and/or indicate a particular icon or region to which each virtual key can be associated. For example, the change of appearance can include a change of color or highlighting of the perimeter, or the area within the perimeter, of the virtual key. In another example, the change of appearance can include a rendering of a symbol, letter, number, or object within the virtual key.

In one embodiment, an "x" can be rendered within each virtual key to identify the assigning of the programmatic action to the physical key associated with each virtual key. In addition, the "x," or other indicator, can identify the location, or icon, associated with each virtual key. For example, indicator 405 within virtual key 410 can reside outside of the perimeter of icon 210. The location of indicator 405 can indicate that virtual key 410 is not associated with icon 210. As such, the selection of the physical key mapped to virtual key 410 will not result in the assigned programmatic action being invoked upon icon 210.

Alternatively, indicator 415 within the virtual key 420 can reside within the perimeter of icon 210. The location of indicator 415, within the perimeter of icon 210, can indicate that virtual key 420 is associated with icon 210. As such, the selection of the physical key mapped to virtual key 420 can invoke the assigned programmatic action to icon 210.

In one embodiment, at each iterative step of the navigation process, the system can intelligently determine issues related to a navigation step, or a programmatic action. For example, subsequent to a user navigating to a particular region of the GUI layer, the system can alert the user as to a number of icons residing within the particular region. In another example, responsive to selecting a physical key to invoke a programmatic action upon an icon, the system can determine the user has selected a region in which two icons reside. The system can query the user as to which of the two icons residing in the selected region the programmatic action will be applied. The system can determine the user has selected a region which does not contain an icon. The system then can alert the user that no icon was detected in the selected region, and therefore, no programmatic action was taken.

Responsive to the selection of the physical key, and the invoking of the assigned programmatic action, the virtual keyboard 120 can be removed from user interface 400. Accordingly, the user can return to a full view of the GUI layer, e.g., where no regions are magnified and virtual keyboard 120 is removed from the display, until such time as further navigation of the GUI layer may be desired.

Figure 5:
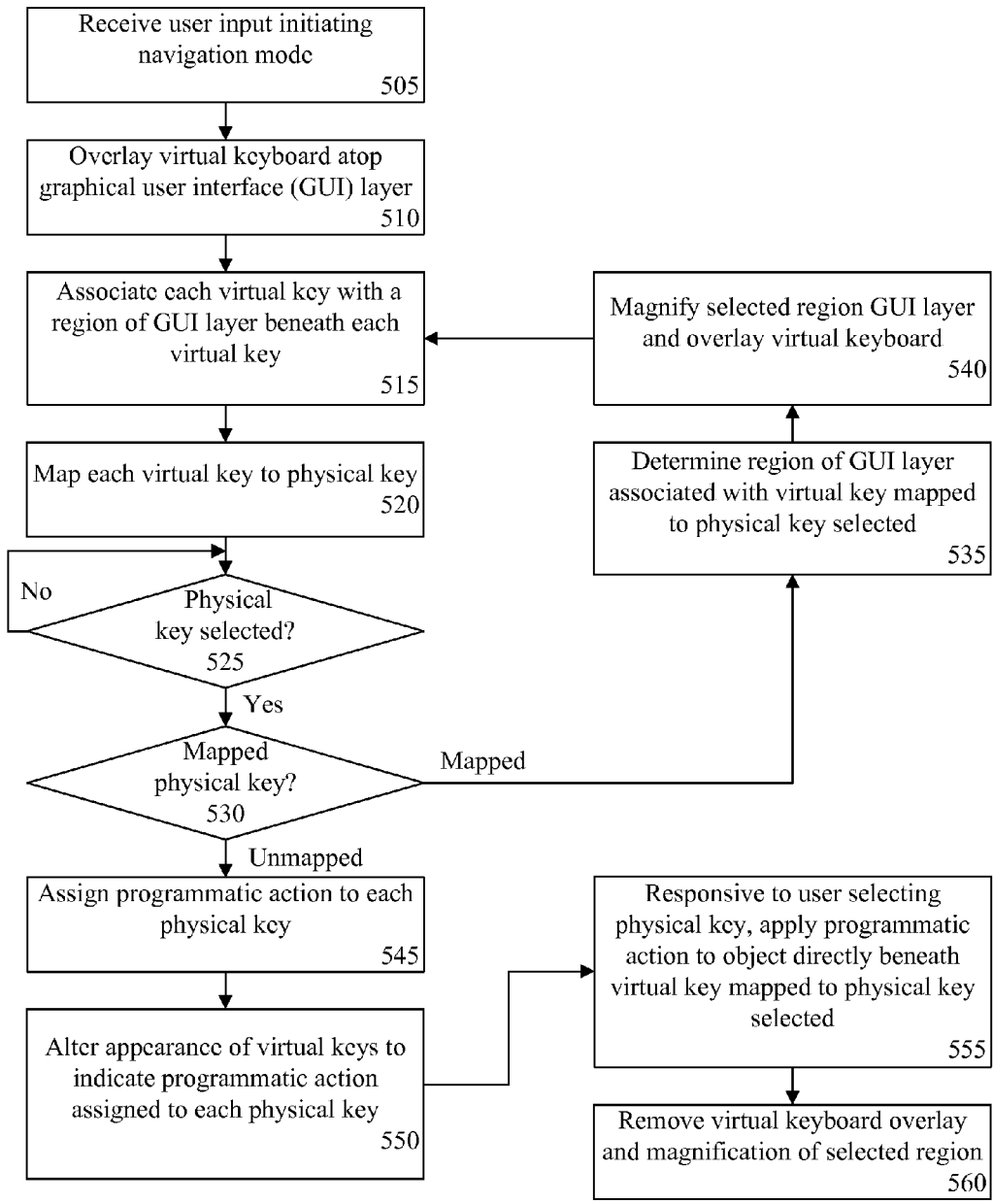
FIG. 5 is a flow chart illustrating a method of keyboard based GUI navigation in accordance with another embodiment of the present invention.

FIG. 5 is a flow chart illustrating a method 500 of keyboard based GUI navigation in accordance with another embodiment of the present invention. The method 500 can be implemented using a system such as that described with reference to FIG. 1 or any other system with the same or similar functionality.

Accordingly, in step 505, the system can receive a user input initiating a navigation mode on the system. In the navigation mode, the user can navigate within a GUI rendered on a display device of the system using the physical keyboard of the system. In step 510, the system can overlay a virtual keyboard atop a GUI layer rendered within a display of the system.

In step 515, the system can associate each virtual key with a region of the GUI layer beneath each virtual key. Each region can be defined by the perimeter of the virtual key. Alternatively, each region can be defined by a predetermined area beneath, and surrounding, the perimeter of the virtual key. In step 520, the system can map each virtual key to a physical key on a physical keyboard communicatively linked to the system. In this manner, each physical key can be mapped to a region of the GUI layer beneath a particular virtual key corresponding to each physical key.

In decision box 525, the system can monitor for a user input selecting a physical key. When the selection of a physical key is detected, method 500 can continue to decision box 530. When the selection of a physical is not detected the method 500 can return to step 525 and continue monitoring for the selection of a physical key. Though not shown, it should be appreciated that error handling and a mechanism to exit the method illustrated in FIG. 5 may be introduced at this point or various other points of the flow chart. In any case, in decision box 530, the system can determine whether the user has selected a mapped physical key or a physical key that is not mapped to a virtual key of the virtual keyboard, e.g., a function key. When the user has selected a unmapped physical key, method 500 can continue to step 545. When the user has selected a mapped physical key, the method can continue to step 535.

In step 535, the system can determine the region of GUI layer associated with the virtual key mapped to the selected physical key. For example, the user can press the "tab" key of the physical keyboard which is mapped to the "tab" virtual key on the virtual keyboard. The system can determine the "tab" virtual key is associated with the region of the GUI layer directly beneath the "tab" virtual key, e.g., the portion of GUI layer outlined by the perimeter of the "tab" virtual key.

In step 540, the system can magnify the selected region of the GUI layer. Additionally, the virtual keyboard can be overlaid atop the magnified, selected region. Accordingly, method 500 can return to step 515, where regions, or sub-regions as the case may be, of the GUI layer can be remapped as the positioning of elements of the GUI layer will have changed with respect to the virtual keyboard above with the magnification applied. The system navigates, or "zooms into," the selected region, thereby redrawing the GUI layer beneath the virtual keyboard using a higher level of magnification upon the selected region.

Continuing with step 545, with the user having navigated to a desired region of the GUI layer, responsive to a user input, the system can determine that an unmapped physical key has been selected that assigns a particular programmatic action to each mapped physical key. The user input assigning the programmatic action can be applied to any physical key of the physical keyboard not mapped to a virtual key. As such, the programmatic action can be assigned to all virtual keys of the virtual keyboard.

In step 550, the system can alter an appearance of each virtual key to identify the assignment of a programmatic action to each mapped physical key. In addition, the altered appearance can provide an identifier or indicator of an association of an icon, or region, with each virtual key. In one embodiment, an indicator can be rendered within each virtual key subsequent to the user input assigning a programmatic action to the virtual keys. The presence of the indicator within each virtual key can indicate a programmatic action has been assigned to the virtual key. Additionally, the location of the identifier can indicate the icon beneath the virtual key associated with the virtual key. In this manner, the icon upon which the programmatic action will be applied can be identified prior to a mapped physical key being selected.

In step 555, responsive to the user pressing a mapped physical key the system can apply the assigned programmatic action to an icon beneath, and associated with, the virtual key mapped to the physical key that was pressed. For example, a programmatic action of opening a file can be assigned to each physical key. The system can render an "x" in each virtual key responsive to the assignment of the programmatic action to the physical keys. The "x" rendered within a virtual key "M," mapped to physical key "M," can be atop a document file the user has selected to open. Responsive to the user pressing the "M" physical key, the system can open the selected document file.

In step 560, subsequent to the programmatic action being invoked, or alternatively responsive to the user invoking a function that exits the GUI navigation technique described within this specification, the system can remove the virtual keyboard overlay. With the virtual keyboard removed, the user can continue operation within the GUI until such time as the user wishes to repeat the initiation of the navigation mode. In one embodiment, subsequent to the programmatic action being applied, the system can return to an original rendering of the GUI layer as presented prior to the user initiating the navigation mode. In other words, the display view can zoom out to a full presentation of the GUI layer as provided prior to the initiation of the navigation mode. Such "demagnification" can be useful particularly where the result of a programmatic action is displayed elsewhere on the display and outside of the magnified region rendered on the display.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The flowchart(s) and block diagram(s) in the figures illustrate the architecture, functionality, and operation of possible implementations of systems, methods, and computer program products according to various embodiments of the present invention. In this regard, each block in the flowchart (s) or block diagram(s) may represent a module, segment, or portion of code, which comprises one or more executable instructions for implementing the specified logical function (s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagram(s) and/or flowchart illustration(s), and combinations of blocks in the block diagram(s) and/or flowchart illustration(s), can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to the embodiments thereof, it will be apparent that modifications and variations are possible without departing from the scope of the invention defined in the appended claims.

What is claimed is:

1. A computer-implemented method of navigating a graphical user interface (GUI), the method comprising:
   responsive to a user input initiating a navigation mode, overlaying, atop of the GUI located within a first layer, a virtual keyboard within a second layer, wherein the virtual keyboard comprises a plurality of virtual keys;
   for each virtual key, associating the virtual key with a region of the first layer comprising an area of the GUI beneath the virtual key;
   mapping each virtual key with a physical key of a physical keyboard communicatively linked with a computer rendering the GUI;
   responsive to a user input selecting a physical key of the physical keyboard, selecting a region corresponding to the selected physical key and increasing a level of magnification for the selected region within the first layer while keeping the virtual keyboard sizing constant, and assigning one of a plurality of programmatic actions to each physical key of the physical keyboard;
   determining that a virtual key is above an icon within the first layer and, in response, changing an appearance of the virtual key to indicate that a selection of a physical key mapped to the virtual key initiates a programmatic action upon the icon; and
   responsive to a user input selecting the physical key mapped to the virtual key above the icon, initiating the assigned programmatic action on the icon.

2. The computer-implemented method of claim 1, wherein responsive to a user input selecting a physical key of the physical keyboard, selecting a region corresponding to the selected physical key and increasing a level of magnification for the selected region within the first layer while keeping the virtual keyboard sizing constant further comprises:

for each virtual key, associating the virtual key with a sub-region of the magnified selected region within the first layer beneath the virtual key; and responsive to a subsequent user input selecting a physical key of the physical keyboard, selecting the sub-region of the magnified selected region corresponding to the selected physical key and increasing a level of magnification for the selected sub-region within the first layer while keeping the virtual keyboard sizing constant.

3. The computer-implemented method of claim 1, wherein increasing a level of magnification for the selected region further comprises redrawing the GUI with the selected region centered beneath the virtual keyboard and at a higher level of magnification, wherein the selected region occupies a greater area of a display than was occupied at the lower level of magnification.

4. The computer-implemented method of claim 1, further comprising, in response to determining that the virtual key is above the icon changing the appearance of the virtual key to indicate the virtual key is above a graphic representation of an object within the first layer.

5. The computer-implemented method of claim 1, wherein responsive to a user input selecting a physical key mapped to a virtual key above the icon, initiating the assigned programmatic action on the icon further comprises removing the virtual keyboard subsequent to the user input selecting the physical key.

6. The computer-implemented method of claim 1, wherein the virtual keyboard is a facsimile of at least a portion of the physical keyboard.

7. The computer-implemented method of claim 1, wherein responsive to a user input initiating a navigation mode, overlaying, atop of the GUI located within a first layer, a virtual keyboard within a second layer, wherein the virtual keyboard comprises a plurality of virtual keys further comprises displaying the virtual keyboard in a semi-transparent form, wherein the GUI located within the first layer is not obscured subsequent to overlaying of the virtual keyboard.

8. The computer-implemented method of claim 1, wherein responsive to a user input selecting a physical key of the physical keyboard, selecting a region corresponding to the selected physical key and increasing a level of magnification for the selected region within the first layer while keeping the virtual keyboard sizing constant further comprises receiving a user input defining the level of magnification for the selected region within the first layer.

9. A computer-implemented method of performing programmatic actions through a graphical user interface (GUI), the method comprising:

responsive to a user input initiating a navigation mode, overlaying, atop of the GUI located within a first layer, a virtual keyboard within a second layer, wherein the virtual keyboard comprises a plurality of virtual keys;

for each virtual key, associating the virtual key with a region of the first layer comprising an area of the GUI beneath the virtual key;

mapping each virtual key with a physical key of a physical keyboard communicatively linked with a computer rendering the GUI;

responsive to a user input selecting a physical key of the physical keyboard, selecting a region corresponding to the selected physical key and increasing a level of magnification for the selected region within the first layer while keeping the virtual keyboard sizing constant, and assigning one of a plurality of programmatic actions to each physical key of the physical keyboard;

determining that a virtual key is above an icon within the first layer and, in response, changing an appearance of the virtual key to indicate the virtual key is above a graphic representation of an object within the first layer; and responsive to a user input selecting the physical key mapped to the virtual key above the icon, initiating the assigned programmatic action on the icon.

10. The computer-implemented method of claim 9, wherein responsive to a user input selecting a physical key mapped to a virtual key above the icon, initiating the assigned programmatic action on the icon further comprises for each virtual key of the virtual keyboard, determining whether the virtual key is above an icon within the first layer.

11. The computer-implemented method of claim 9, wherein responsive to a user input selecting a physical key of the physical keyboard, selecting a region corresponding to the selected physical key and increasing a level of magnification for the selected region within the first layer while keeping the virtual keyboard sizing constant further comprises:

for each virtual key, associating the virtual key with a sub-region of the magnified selected region within the first layer beneath the virtual key; and responsive to a subsequent user input selecting a physical key of the physical keyboard, selecting a sub-region of the magnified selected region corresponding to the selected physical key and increasing a level of magnification for the selected sub-region within the first layer while keeping the virtual keyboard sizing constant.

12. A computer program product comprising:

a computer-usable storage device having stored thereon computer-usable program code that navigates a graphical user interface (GUI) responsive to inputs from a physical keyboard, the computer-usable program code comprising:

computer-usable program code that, responsive to a user input initiating a navigation mode, overlays, atop of the GUI located within a first layer, a virtual keyboard within a second layer, wherein the virtual keyboard comprises a plurality of virtual keys;

computer-usable program code that, for each virtual key, associates the virtual key with a region of the first layer comprising an area of the GUI beneath the virtual key;

computer-usable program code that maps each virtual key with a physical key of the physical keyboard communicatively linked with a computer rendering the GUI; and computer-usable program code that, responsive to a user input selecting a physical key of the physical keyboard, selects a region corresponding to the selected physical key and increases a level of magnification for the selected region within the first layer while keeping the virtual keyboard sizing constant, and assigns one of a plurality of programmatic actions to each physical key of the physical keyboard;

computer-usable program code that determines a virtual key is above an icon within the first layer and, in response, changes an appearance of the virtual key to indicate that a selection of a physical key mapped to the virtual key initiates a programmatic action upon the icon; and computer-usable program code that, responsive to a user input selecting the physical key mapped to the virtual key above the icon, initiates the assigned programmatic action on the icon.

13. The computer program product of claim 12, wherein the computer-usable program code that, responsive to a user input selecting a physical key of the physical keyboard, selects a region corresponding to the selected physical key and increases a level of magnification for the selected region within the first layer while keeping the virtual keyboard sizing constant further comprises:

computer-usable program code that, for each virtual key, associates the virtual key with a sub-region of the magnified selected region within the first layer beneath the virtual key; and computer-usable program code that, responsive to a subsequent user input selecting a physical key of the physical keyboard, selects a sub-region of the magnified selected region corresponding to the selected physical key and increases a level of magnification for the selected sub-region within the first layer while keeping the virtual keyboard sizing constant.

14. The computer program product of claim 12, wherein the computer-usable program code that, responsive to a user input selecting a physical key of the physical keyboard, selects a region corresponding to the selected physical key and increases a level of magnification for the selected region within the first layer while keeping the virtual keyboard sizing constant further comprises computer-usable program code that redraws the GUI with the selected region centered beneath the virtual keyboard and at a higher level of magnification, wherein the selected region occupies a greater area of a display than was occupied at the lower level of magnification.

15. The computer program product of claim 12, wherein the computer-usable program code further comprises computer-usable program code that, in response to determining that the virtual key is above the icon changes the appearance of the virtual key to indicate the virtual key is above a graphic representation of an object within the first layer.

* * * * *